June 1, 1954 G. J. DIEBOLD 2,679,860
EXPLOSION RELIEF VALVE
Filed Feb. 16, 1952

INVENTOR
GEORGE J. DIEBOLD
BY
*Pennie, Edmonds, Morton, Barrows and Taylor*
ATTORNEYS Patented June 1, 1954

2,679,860

UNITED STATES PATENT OFFICE 2,679,860

EXPLOSION RELIEF VALVE

George J. Diebold, Livingston, N. J., assignor to Janke and Company, Hackensack, N. J., a corporation of New Jersey Application February 16, 1952, Serial No. 271,906

5 Claims. (Cl. 137—525.5)

This invention relates to explosion-proof testing devices and, more particularly, to an explosion relief valve for such a device.

In the interest of safety, it is important that control apparatus whether electrically, hydraulically or mechanically operated, and other devices for use in aircraft be safe to operate in the presence of an explosive atmosphere. The possibility of the presence of an explosive mixture of gasoline vapor and air within parts of an aircraft makes it essential that operating apparatus within the aircraft structure be free from any arcing or other high temperature proclivity. In order to ascertain this information under simulated conditions, explosion-proof testing devices have been developed which are capable of permitting controlled operation of the apparatus within a closed test chamber containing an ignitible explosive atmosphere. If the atmosphere is exploded by operation of the apparatus being tested, the exploding atmosphere must be substantially unconfined as it would be in practice, and for this purpose the test chamber must be provided with an explosion relief valve. Moreover, in order to be certain that the test atmosphere is actually explosive, and in order further to establish the ability of the apparatus under test to withstand an ambient explosion, each test must be concluded with an actual explosion of the test chamber atmosphere. Accordingly, the explosion relief valve must be sufficiently rugged to withstand repeated operation.

The present invention resides in a novel explosion relief valve for explosion-proof testing devices of the type referred to hereinbefore. The explosion relief valve of the invention comprises a rubber diaphragm so positioned as to engage and close the exit end of an explosion relief exhaust outlet in the test chamber, and further includes a convexly-shaped supporting member engaging the center of the diaphragm at its apex and adapted to support and retard the moving diaphragm when the latter is forced outwardly thereagainst in relief of an explosion in the chamber. In the presently preferred embodiment of the relief valve of the invention, the supporting member for the diaphragm is so positioned with respect to the exit end of the exhaust outlet as to normally hold the diaphragm a spaced distance away from this exit end of the outlet, and resilient supporting means are provided for urging the peripheral portion of the diaphragm into a position in which it will close the exit end of the explosion relief outlet.

Figure 1:
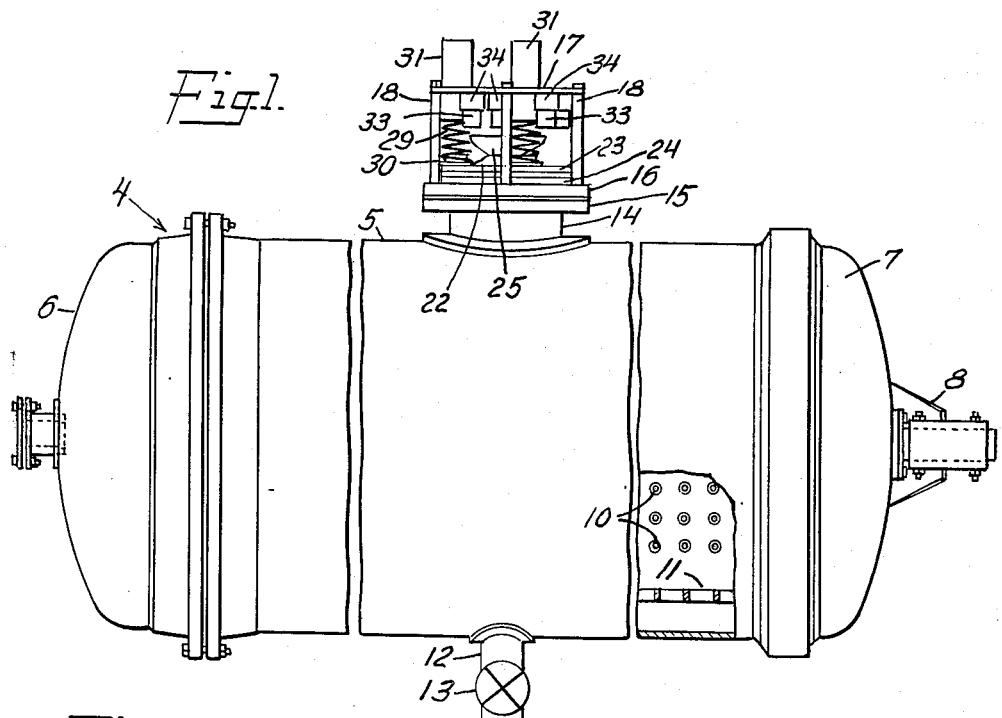
Figure 2:
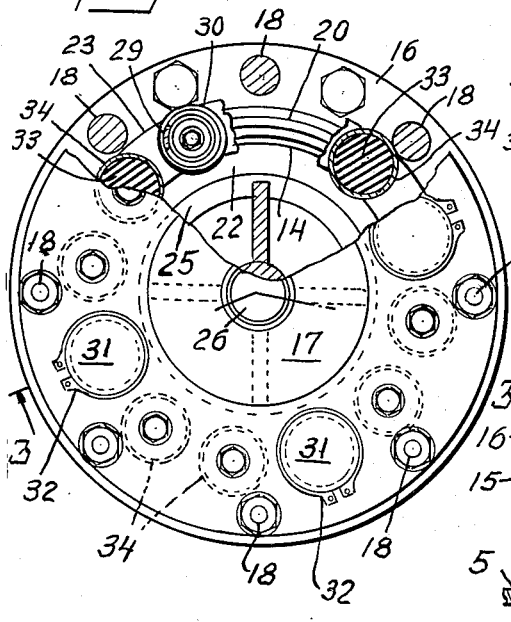
Figure 3:
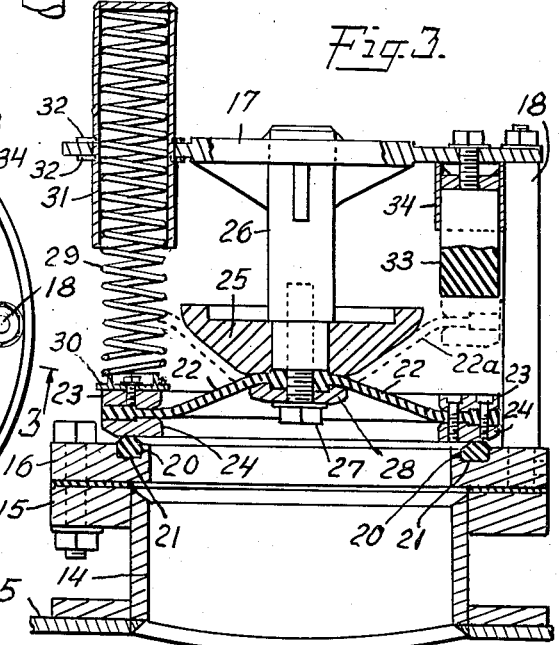

These and other novel features of the invention will be more readily understood by reference to the accompanying drawings in which Fig. 1 is a side elevation of an explosion-proof testing device embodying the explosion relief valve of the invention;

Fig. 2 is a partial cutaway plan view of the explosion relief valve assembly of Fig. 1; and Fig. 3 is a sectional side elevation taken along the line 3—3 in Fig. 2.

A representative explosion-proof testing device 4 is shown in Fig. 1 and comprises a cylindrical chamber 5 provided at one end with a fixed but advantageously removable end closure 6 and provided adjacent the other end with a readily openable end closure or door 7, the latter being mounted on a hinge member 8. The interior of the chamber is provided with internally disposed electrical, hydraulic and mechanical connections 10, and a supporting rack 11 for the apparatus to be tested, so that a variety of control components such as conduits, wires, connectors, cables, terminals, fuses, locking devices, and the like, may be tested. The chamber is further provided with suitable means 12 for introducing gasoline vapor or combustible gas into the test chamber in order to establish an ignitable explosive atmosphere therewithin. The inlet means 12 is provided with a suitable valve 13 which can be closed before the apparatus to be tested is operated within the test chamber. Accordingly, if an explosion takes place within the test chamber, it is vented solely through an explosion relief exhaust outlet 14.

The explosion relief exhaust outlet 14 is advantageously provided with a flange 15 on which there can be mounted the explosion relief valve assembly of the present invention. As shown in Fig. 1, the valve assembly is enclosed within a lower supporting ring 16 and an upper supporting plate 17 secured in fixed spaced relationship by spacing studs 18. As more clearly shown in Fig. 3, the explosion relief valve assembly is secured to the exhaust outlet 14 by bolting the lower supporting ring 16 of the valve assembly to the flange 15 at the exit end of the exhaust outlet. The lower supporting ring 16 of the valve assembly is provided with a valve seat comprising a rubber ring 20 mounted in an annular recess 21 in the upper face of the supporting ring 16. The valve closure member comprises a rubber diaphragm 22 having metal supporting rings 23 and 24 affixed to both sides thereof adjacent its periphery, the rings 23 and 24 being clamped about the diaphragm 22 by screws or other suitable bolting means. The supporting rings 23 and 24 have an outside diameter somewhat less than the inside diameter of the circle defined by the inboard surfaces of the spacing studs 18. The supporting rings 23 and 24 are thus free to move vertically within the circle formed by the studs 18.

The rubber diaphragm 22 is mounted adjacent the apex of a convexly-shaped supporting disc 25. The supporting disc is mounted on a supporting stud 26 which is welded or otherwise secured to the upper supporting plate 17. It will be seen, accordingly, that the supporting disc 25 is rigidly mounted and is backed by the upper supporting plate 17. The diaphragm is secured to the supporting disc 25 adjacent the center of the diaphragm by a suitable bolt 27 and a washer 28, the washer 28 being provided with beveled edges to prevent damage to the diaphragm under operating conditions. It will be seen, accordingly, that the diaphragm is held in a centered position with respect to the exit end of the chamber exhaust outlet by the supporting disc 25 and by the guidance of the studs 18 surrounding the diaphragm supporting rings 23 and 24.

In the presently preferred embodiment of the valve assembly, it has been found advantageous to so position the supporting disc 25 with respect to the exit end of the exhaust outlet 14 as to normally hold the diaphragm 22 a spaced distance away from the exit end of the outlet. Thus, when the outer portion of the diaphragm is moved away from the exhaust outlet by the force of the explosion within the test chamber, all portions of the diaphragm, including its rigidly supported center, will be positioned outside of the outlet 14 and thereby provide the full area of the outlet for escape of the explosion gases. And in order to hold the diaphragm in a normally-closed position, with this preferred arrangement, resilient supporting means is provided for urging the peripheral portion of the diaphragm 22, represented by the supporting rings 23 and 24, into engagement with the valve seat 20. This supporting means advantageously comprises, as shown in Fig. 3, a compression spring 29 engaging a spring seat 30 mounted adjacent the upper surface of the diaphragm peripheral supporting ring 23. The upper end portion of the spring 29 is enclosed in a spring housing 31 which, in turn, is mounted in the upper supporting plate by means of retaining rings 32. A plurality of these resilient supporting spring assemblies is provided at spaced intervals around the valve assembly, the total compressive force of the springs used in these assemblies being merely sufficient to insure a tight seal between the lower diaphragm supporting ring 24 and the rubber valve seat 20 when atmospheric pressure prevails within the chamber. The springs 29 need offer no significant contribution to the arresting of the outward movement of the diaphragm in the relief of an explosion within the test chamber.

In relief of an explosion within the test chamber, the rubber diaphragm 22 is forced upwardly away from the exhaust outlet by the force of the expanding explosion gases. The force of the explosion causes the diaphragm to be forced upwardly against the convex surface of the supporting disc 25 as shown by the dotted lines 22a in Fig. 3, thus assuming a position particularly conducive to the ready escape and substantially streamline flow of the explosion gases. As the rubber diaphragm 22 tends to wrap itself over the convex surface of the supporting disc 25, stretching of the diaphragm takes place and this stretching is counteracted to a significant extent by the friction between the contacting surfaces of the rubber diaphragm and the metal supporting disc 25. In this manner the supporting disc 25 effectively arrests the violent upward movement of the rubber diaphragm and brings it to rest without damage. The provision of a plurality of rubber bumpers 33 mounted in supporting seats 34 secured to the upper supporting plate 17 of the valve assembly further contributes to arresting the upward movement of the peripheral portion of the diaphragm 22 so as to restrain further deformation or movement of the diaphragm after the diaphragm has conformed to the shape of the supporting disc 25. As soon as the explosion gases have been relieved through the valve, the springs 29 return the diaphragm to its operative position.

The rubber valve seat 20, the diaphragm 22 and the bumpers 33 may be formed from natural or synthetic rubber or other rubber-like material. Wholly satisfactory results have been obtained with neoprene rubber although other resilient synthetic rubber-like materials including the polymers of butadiene-styrene, butadiene-acrylonitrile, polybutadiene, isoprene-acrylonitrile, and polychloroprenes may be used with advantage. It has been found that the duration of contact with the explosion exhaust gases with these rubber parts causes no significant deterioration thereof and that they will therefore withstand extended use without failure.

It will be seen, accordingly, that the explosion relief valve of the invention is capable of relieving the explosion pressure within the test chamber nearly as quickly as it is built up by the explosion. This result is attributable in large measure to the small inertia of the valve diaphragm, its short path of travel in relieving the explosion gases, and its position and shape under explosion-relieving conditions. The further attribute of the virtual absence of moving parts other than the rubber diaphragm itself contributes to the effectiveness of the valve assembly in relieving the explosions occurring within the test chamber.

I claim:

1. An explosion-proof testing device comprising a closed test chamber wherein a device to be tested can be operated in the presence of an ignitible explosive atmosphere, an explosion relief exhaust outlet for the chamber, and an explosion relief valve in operative engagement with said exhaust outlet, said explosion relief valve comprising a rubber diaphragm so positioned as to engage and close the exit end of said outlet, and a convexly-shaped supporting member engaging the diaphragm at its apex and adapted to support and retard the diaphragm when the latter is forced outwardly thereagainst in relief of an explosion within the chamber.

2. An explosion-proof testing device comprising a closed test chamber wherein a device to be tested can be operated in the presence of an ignitible explosive atmosphere, an explosion relief exhaust outlet for the chamber, and an explosion relief valve in operative engagement with said exhaust outlet, said explosion relief valve comprising (a) a rubber diaphragm so positioned as to engage and close the exit end of said outlet, (b) a convexly-shaped supporting member engaging the center of the diaphragm at its apex and adapted to support and retard the diaphragm when the latter is forced outwardly thereagainst by an explosion within the chamber, the supporting member being so positioned with respect to the exit end of the exhaust outlet as to normally hold the diaphragm a spaced distance away from said exit end, and (c) resilient supporting means urging the peripheral portion of the diaphragm into said outlet-closing position.

3. In an explosion-proof testing device including a closed test chamber wherein a device to be tested can be operated in the presence of an ignitible explosive atmosphere, and an explosion relief exhaust outlet for the chamber, the improvement which comprises an explosion relief valve in operative engagement with said exhaust outlet and comprising a rubber valve seat adjacent the exit end of the exhaust outlet, a rubber diaphragm having a peripherally mounted rigid sealing ring adapted to engage said valve seat, the diaphragm being so positioned as to engage and close the exit end of said outlet, a convexly-shaped supporting member engaging the center of the diaphragm at its apex and adapted to support and retard the diaphragm when the latter is forced outwardly thereagainst by an explosion within the chamber, the supporting member being so positioned with respect to the exit end of the exhaust outlet as to normally hold the diaphragm a spaced distance away from said exit end, and resilient supporting means urging the peripheral sealing ring of the diaphragm into said outlet-closing position.

4. In an explosion-proof testing device including a closed test chamber wherein a device to be tested can be operated in the presence of an ignitible explosive atmosphere, and an explosion relief exhaust outlet for the chamber, the improvement which comprises an explosion relief valve in operative engagement with said exhaust outlet and comprising a rubber valve seat adjacent the exit end of the exhaust outlet, a rubber diaphragm having a peripherally mounted rigid sealing ring adapted to engage said valve seat, the diaphragm being so positioned as to engage and close the exit end of said outlet, a convexly-shaped supporting member engaging the diaphragm at its apex and adapted to support and retard the diaphragm when the latter is forced outwardly thereagainst by an explosion within the chamber, and a plurality of rubber bumpers positioned peripherally adjacent said supporting member in such position as to restrain further movement of the diaphragm ring when the diaphragm is forced outwardly against and conforms to the shape of said supporting member.

5. In an explosion-proof testing device including a closed test chamber wherein a device to be tested can be operated in the presence of an ignitible explosive atmosphere, and an explosion relief exhaust outlet for the chamber, the improvement which comprises an explosion relief valve in operative engagement with said exhaust outlet and comprising a rubber valve seat adjacent the exit end of the exhaust outlet, a rubber diaphragm having a peripherally mounted rigid sealing ring adapted to engage said valve seat, the diaphragm being so positioned as to engage and close the exit end of said outlet, a convexly-shaped and rigidly mounted supporting member engaging the center of the diaphragm at its apex and adapted to support and retard the diaphragm when the latter is forced outwardly thereagainst by an explosion within the chamber, the supporting member being so positioned with respect to the exit end of the exhaust outlet as to normally hold the diaphragm a spaced distance away from said exit end, resilient supporting means urging the peripheral sealing ring of the diaphragm into said outlet-closing position, and a plurality of rubber bumpers positioned peripherally adjacent said supporting member in such position as to restrain further movement of the diaphragm ring when the diaphragm is forced outwardly against and conforms to the shape of said supporting member.

References Cited in the file of this patent

UNITED STATES PATENTS

| Number | Name | Date |
|---|---|---|
| 198,071 | Blake | Dec. 11, 1877 |
| 1,614,124 | Hansen | Jan. 11, 1927 |

FOREIGN PATENTS

| Number | Country | Date |
|---|---|---|
| 556,651 | Germany | Aug. 12, 1932 |